H. T. BRUNS.
STARTING VALVE FOR INTERNAL COMBUSTION ENGINES.
APPLICATION FILED DEC. 23, 1909.
1,077,795.
Patented Nov. 4, 1913.
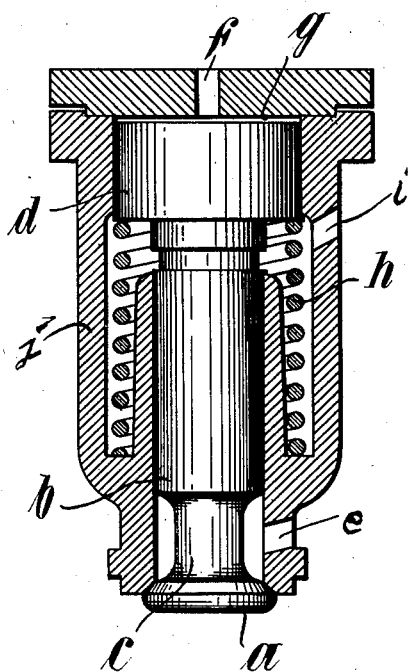

UNITED STATES PATENT OFFICE.

HANS THEODOR BRUNS, OF NUREMBERG, GERMANY.

STARTING-VALVE FOR INTERNAL-COMBUSTION ENGINES.

1,077,795.

Specification of Letters Patent.    Patented Nov. 4, 1913.

Application filed December 23, 1909.   Serial No. 534,587.

*To all whom it may concern:*

Be it known that I, HANS TH. BRUNS, a subject of the King of Prussia, residing at Nuremberg, in the Kingdom of Bavaria and German Empire, have invented new and useful Improvements Relating to Starting-Valves for Internal-Combustion Engines, of which the following is a specification.

For starting internal combustion engines, valves operated by compressed air are ordinarily used. As a rule, the compressed air is cut off while the engine is running. In order that the valves do not open under the high explosion pressure, they are arranged so as to open inwardly. Means, however, must be provided to prevent the valve from remaining permanently open, after the engine had once been started. To this end, a compensating piston is used in combination with a spring, which tends to force the valve on its seat. The valve is actuated by the compensating piston, which when placed under pressure, will open the valve, the rear end of the piston serving as a piston adapted to transmit the pressure of the compressed air to operate the valve. Such an arrangement, however, does not make the operation of the starting valve certain.

Opposite forces balancing each other act upon the compensating piston and its rear end. Atmospheric pressure acts from the outside upon the valve itself while from the inside the pressure of the working cylinder acts in addition to the spring tending to close the valve. As long as the pressure in the cylinder is substantially lower than that of the compressed air, (*i. e.* shortly after the opening of the valve), the compressed air will overcome the combined pressures of the spring and of the cylinder and the valve is kept open. As the pressure in the cylinder rises and reaches a certain amount, it will in conjunction with the pressure of the spring overcome the pressure of the compressed air and close the valve again. As the compressed air, however, expands in the cylinder, the compressed air acting on the rear end of the piston will again preponderate in force, the valve re-opens and the same operation is repeated—the valve chatters. According to my present invention, this chattering is avoided by reason of the fact that the compensating piston and the piston adapted to transmit the pressure of the compressed air to operate the valve are separate, so that the compressed air can act on the pressure transmitting piston on one side only while its other side is under atmospheric pressure. In this way, the pressure transmitting piston and the compensating piston can be made of different areas, so that when the former is operated, the pressures acting upon the same and upon the compensating piston will no longer balance each other. There is no difficulty in making the pressure acting upon the pressure transmitting piston as much greater as desired than that acting upon the compensating piston, so that it will always be greater than the forces of the spring and of the air contained in the cylinder, which forces tend to close the valve.

With reference to the accompanying drawing: *a* is the valve upon which the pressure prevailing for the time being in the combustion cylinder acts from below. *b* is the compensating piston which serves to compensate for the pressure exerted by the compressed air, which is used for starting purposes and enters through the opening *e* to act upon the annular face *c*. The compensating piston at the other end carries the separate piston *d* adapted to transmit the pressure of the compressed air to operate the valve, the inward face of which piston is under atmospheric pressure, to which end, the casing *j* communicates with the atmosphere through an opening *i*. Compressed air is admitted through the passage *f* into the chamber *g*, containing the sage *f* into the chamber *g*, containing the piston *d*. The compressed air presses upon the entire face of the piston *d*, which has such an area that the valve *a* will open with certainty and will be maintained in this open position even though the pressure prevailing in the combustion cylinder be greater than the pressure of the compressed air entering through *f*. The valve is closed by the spring *h* contained in casing *j*, as soon as the compressed air is discharged from the chamber *g*.

I claim:

In internal combustion engines the combination with a valve for admitting compressed air to the engine cylinder for starting purposes, adapted to be subjected to the pressure of compressed air, and an operating piston for said valve, of a spring bearing against that side of the piston opposite to the side on which it is subjected to the pressure of compressed air, and a separate compensating piston having a smaller area than the said operating piston and placed intermediate between said operating piston and said valve.

In testimony whereof I have signed my name to this specification in the presence of two subscribing witnesses.

HANS THEODOR BRUNS.

Witnesses:
 BERNHARD GRAETZ,
 CARL GARRY.